United States Patent [19]

Reinhart et al.

[11] 3,925,565

[45] Dec. 9, 1975

[54] SIMULATED MEAT PRODUCT

[75] Inventors: Robert R. Reinhart, Des Plaines; George M. Smith, Jr., Crystal Lake, both of Ill.

[73] Assignee: The Quaker Oats Company, Chicago, Ill.

[22] Filed: May 28, 1974

[21] Appl. No.: 473,569

Related U.S. Application Data

[63] Continuation-in-part of Ser. No. 180,122, Sept. 13, 1971, abandoned.

[52] U.S. Cl. ............... 426/447; 426/445; 426/514; 426/516; 426/802
[51] Int. Cl.² .................... A23J 3/00; A23P 1/00
[58] Field of Search .......... 426/205, 431, 430, 148, 426/146, 212, 185, 364, 520, 350, 802, 65, 250, 372, 194, 104, 506, 137, 448, 445, 443, 480, 514, 516, 518

[56] References Cited
UNITED STATES PATENTS

| 3,142,571 | 7/1964 | McAnelly | 426/141 |
| 3,440,054 | 4/1969 | Sair | 426/141 |
| 3,810,764 | 5/1974 | Waggle | 426/364 |

Primary Examiner—A. Louis Monacell
Assistant Examiner—Thomas G. Wiseman
Attorney, Agent, or Firm—Donnie Rudd

[57] ABSTRACT

A process is disclosed for preparing a puffed food product simulating meat or the like. The process comprises admixing a protein material of a certain type having specified protein concentrations with specified amounts of water, subjecting the mixture to an elevated pressure and temperature, extruding the mixture in an annular shape without puffing it, placing the extrudate in a confined space, subjecting the extrudate to a water-boiling temperature for a specified time at a specified pressure, and instantly releasing the pressure on the extrudate causing it to puff and resemble simulated meat or the like.

18 Claims, No Drawings

SIMULATED MEAT PRODUCT

CROSS REFERENCE TO RELATED APPLICATIONS

This application is a continuation-in-part of patent application Ser. No. 180,122 filed Sept. 13, 1971 now abandoned.

BACKGROUND OF THE INVENTION

1. Field of the Invention

This invention relates to a simulated meat product produced from concentrated proteinaceous materials.

2. Description of the Prior Art

Many attempts have been made to produce simulated meat products from relatively inexpensive protein sources. Perhaps the most successful of these processes has been the so-called spun protein which utilizes small strands of protein bound together by a binder to simulate meat. Thus far, however, no one has produced a simulated meat product which has the taste and particularly the texture characteristics of natural meat. This invention makes possible a simulated meat product high in protein and having the same texture characteristics as natural meat.

SUMMARY OF THE INVENTION

It is an object of this invention to provide a process for preparing a puffed food product simulating meat or the like and having the texture characteristics of meat.

It is another object of this invention to provide a process for utilizing relatively inexpensive proteinaceous materials to prepare a simulated meat product.

The objects of this invention are accomplished by a process for preparing a puffed food product simulating meat comprising:

A. admixing a proteinaceous mixture of a protein material comprising a member selected from the group consisting of gelatin, microbiological protein, egg white, muscle protein keratins, lactalbumin, and blood having protein concentrations of at least about 30 percent with water in an amount sufficient to provide a final moisture content of from about 25 percent to about 40 percent by weight;

B. subjecting the moistened proteinaceous mixture to a pressure above atmospheric pressure and temperature above 212°F to convert it into a flowable substance;

C. extruding the flowable substance in a uniform linear flow as an extrudate into a medium of lower pressure without puffing the flowable substance, said extruding being accomplished in the form of an annular shape in which both the inside and outside of the annular flowable substance are cooled to a temperature below 212°F in order to avoid puffing;

D. placing the extrudate in a confined space;

E. subjecting the extrudate in the confined space to a water-boiling temperature for a time of from 15 to 75 seconds and a pressure of from 150 to 250 psi; and F. suddenly releasing the pressure on the extrudate in less than 2 seconds causing the extrudate to puff and resemble simulated meat.

The objects of this invention are further accomplished by a preferred embodiment of our invention which comprises the process of preparing a puffed food product which comprises subjecting moist, protein material comprising a member selected from the group consisting of gelatin, microbiological protein, egg white, muscle protein, keratins, lactalbumin, and blood in the presence of sufficient water and at an elevated mechanical pressure such as superatmospheric pressure and a temperature above 212°F to form a moisture-containing, translucent to glassy product, said forming being in an annular shape with the inside and outside of the annular product being cooled below 212°F in order to avoid puffing, partly drying said translucent to glassy product to reduce its moisture content to produce a partly dried product having continuous structure that resists the rapid release of moisture therefrom at elevated temperatures but, under water-boiling puffing conditions, allows for the build-up of pressure in said product from moisture which, when rapidly released from said product under water-boiling puffing conditions, causes said product to puff, and puffing said partly dried product by placing the extrudate in a confined space; subjecting the extrudate in the confined space to a water-boiling temperature (i.e., at least 212°F) for a time of from 15 to 75 seconds and a pressure of from 150 to 250 psi; and suddenly releasing the pressure within 2 seconds on the extrudate causing the extrudate to puff and resemble simulated meat or the like.

The process of this invention requires the utilization of a proteinaceous mixture of a protein material comprising a member selected from the group consisting of gelatin, microbiological protein, egg white, muscle protein, keratins, lactalbumin, and blood having protein concentrations of at least 30 percent by weight. The protein concentration must be at least about 30 percent by weight in order to provide a protein content sufficient to supply the dietary needs of a person consuming the product in lieu of meat or as a partial substitute therefor. The protein material of this invention can be such as sodium caseinate, gelatin, microbiological protein such as yeast and single cell protein, egg white, muscle protein, keratins such as hoofs, hair and features, lactalbumin, and blood, either whole or as blood meal.

The first step in our process requires the admixing of a proteinaceous mixture of a protein material comprising a member selected from the group consisting of gelatin, microbiological protein, egg white, muscle protein, keratins, lactalbumin, and blood with water in an amount sufficient to provide a final moisture content of from 25 percent to 40 percent by weight. The moisture can be readily adjusted within this range by one skilled in the art, but must be maintained within the range if later puffing is to produce a simulated meat product.

The next step in our process requires subjecting the moistened proteinaceous mixture to an elevated pressure and temperature to convert it into a flowable substance. The elevated pressure is a pressure above atmospheric pressure. The elevated temperature is a temperature above the boiling point of water (212°F) up to the degradation point of the material, a temperature of about 350°F.

The next step in our process requires extruding the flowable substance in a uniform linear flow in as an extrudate into a medium of lower pressure in a condition whereat it does not simultaneously purr. In other words, this step requires passing the moistened proteinaceous mixture which has been subjected to an elevated pressure and temperature into a lower pressure range without puffing it. By use of the term "puffing" at this point in the process, we simply mean expansion or that expansion must be prevented. This consequently produces a glassy or glass-like surface on the outer portion of the extrudate. The extrudate has a translucent appearance and a laminar structure. This step requires the forming of the product into an annular cavity or annular shape and then cooling both the inside and outside of the annular cavity below 212°F in order to avoid puffing. The resulting product, based on an annular extrusion, can be more rapidly produced and consequently has less degradation and thus more meat-like appearance in the final product. An example of an apparatus for effecting such a process step may be found in U.S. Patent Application Ser. No. 390,366 by Carlson et al. filed Aug. 22, 1973.

The next step in our invention is preferred although not absolutely necessary and comprises reducing partially the moisture of the issued extrudate without puffing (expanding) it. This can be accomplished by any of the known drying methods such as a hot air stream or a conventional or microwave oven. The critical feature of this step of our invention, when it is used however, is that the extrudate must be partially dried without causing puffing. The preferred range of drying is to a moisture content of from about 20 to 22 percent by weight.

The next steps in our invention require placing the extrudate in a confined space and subjecting the extrudate in the confined space to a water-boiling temperature (i.e., at least 212°F) for a time of from 15 to 75 seconds and a pressure of from 150 to 250 psi. One skilled in the art can readily decide what pressure and time exposure is necessary in order to give him the simulated meat product that he desires.

Finally, the pressure is suddenly released on the extrudate causing the extrudate to puff and resemble simulated meat or the like. The pressure releasing step can be accomplished merely by instantly opening the confined space wherein the exudate has been confined at the higher pressure. The instantaneous release of pressure must be within 2 seconds time. When the extrudate is puffed, it can be dried somewhat or merely left to dry from its own retained heat thus forming a simulated meat product. The product of this invention bears a particularly close resemblance to chicken meat having an exterior skin portion and a fiberous inner portion very much like cooked chicken meat.

This invention relates to a process, as well as the resulting improved products, of preparing a puffed, proteinaceous food product which, if desired, can be used as a food supplement for humans. The process involves: subjecting moist (e.g., crumbly to free-flowing), protein material comprising a member selected from the group consisting of gelatin, microbiological protein, egg white, muscle protein, keratins, lactalbumin, and blood (having protein material which may or may not theretofore be at least partly neutralized, or may or may not be reacted to an at least partly neutralized form) having a controlled amount of water to elevated superatmospheric pressure to form a moisture-containing, translucent to glassy product by formation of an annular shape and then cooling of both the inside and outside of the annular product below 212°F to avoid puffing, then having and having after being optionally dried and before being puffed, continuous structure that resists the rapid or sudden release of moisture therefrom at elevated temperatures but, under water-boiling puffing conditions, allows for the build-up of pressure in the product from moisture which, when instantly released from the product under water-boiling conditions, causes the product to puff; preferably, partly drying the translucent to glassy product; instantly puffing the translucent to glassy product (regardless of whether or not the product was partly dried) under water-boiling conditions; and, if desired, subdividing the product before puffing or subdividing the puffed product.

The structured or textured, puffed product has good texture, water absorption or retention properties, and firmness in the essentially dry state and in water at room temperature, in boiling water, and when retorted. The terms "textured" or "structured" hereinafter sometimes refers to puffed proteinaceous products which when hydrated have the feel, firmness, structure, texture or bite qualities similar to natural food products, for example, such as meat, fish, poultry products, and the like, and puffed food products which are pleasing in the mouth of humans.

The protein materials which may be used in our process include the aforementioned protein materials having a protein content of at least about 30 percent, or preferably, a protein content of at least about 70 percent. If desired, such protein materials may be at least partly neutralized (e.g., with alkali metal or alkaline earth metal hydroxide) so that is has a pH within the range of about 5.5 of 8.5.

When non-neutralized protein material is used, there is a tendency for the puffed product to be somewhat tougher or have somewhat less of an ability to absorb or retain water.

When one wishes to produce a bland, puffed proteinaceous product, which for many purposes is preferred, the protein material should be substantially or essentially pure and have a high protein content. If one wishes to produce a puffed, proteinaceous food product which need not be completely bland, one may use proteinaceous materials of lower protein content.

If desired, the proteinaceous material may include, for some purposes, a desired, edible amount (e.g., preferably less than 50 percent)of percent) of suitable cereal, starch, sugar, coloring material, seasoning or flavoring ingredient, or the like. Those materials may be present in or blended with the proteinaceous material before elevated pressure is applied. One may use, for example, wheat flour, corn starch, yellow corn flour, cane sugar, dextrose, and the like.

Furthermore, it has been found desirable to include an edible form of available calcium (e.g., calcium ions) in or with the proteinaceous material, prior to the time that material is subjected to superatmospheric pressure, for purposes of imparting a sturdier structure (e.g., skeleton-like structure) to the puffed, textured proteinaceous product, so that the puffed product has a higher degree of firmness or chewiness when that product is in an essentially dry state that exists after puffing and when it is subjected to rehydration in boiling water. Although calcium tends to enhance the rehydrated texture of the puffed product in boiling water, good or satisfactory rehydrated firmness or chewiness can be obtained without it. The calcium may be incorporated into the proteinaceous material in the form of an edible calcium salt such as dicalcium phosphate dihydrate, calcium chloride, or the like without imparting an undesired flavor to the puffed proteinaceous product.

The proteinaceous material is in a substantially uniform, moist (e.g., crumbly to free-flowing) state and has a controlled, effective amount of water it is subjected to effective mechanical pressure. The moist material must be subjected to treatment under conditions, including sufficient superatmospheric pressure, which result in that material being transformed into a workable, substantially homogeneous, deformable, flowable, coherent plastic mass which forms a moisture-containing, translucent to glassy product that is not puffed as a result of that treatment and has thermoplastic characteristics. It is preferred that essentially all of the moist proteinaceous material be transformed into the translucent to glassy product. Furthermore, the translucent to glassy product must retain some of its moisture until the product is later puffed in a separate and distinct operation.

The amount of water present during the application of elevated mechanical pressure, the nature of the proteinaceous material, the conditions of temperature, pressure and time used in connection with the compaction operation, the nature of the particular equipment used for applying elevated pressure, and the particular characteristics sought (e.g., fine or course cells or texture) as a result of the later, separate puffing step, are interrelated and should be coordinated. Thus, when one operating condition is varied or selected, that condition in turn can influence the other desired operating conditions. It must be realized, however, that the pressure used must be superatmospheric and can go as high as is necessary to keep the moisture from flashing at the highest temperature range. For instance, at the highest temperature of about 350°F, a pressure of about 136 psi would be the minimum to keep the moisture contained. Also, the temperature will be above the boiling point of water up to a point at which the protein material degrades, say about 350°F.

It has been found, for example, that if too high a temperature is reached or applied during the application of elevated pressure or the material is subjected to too high a temperature during the formation of the translucent to glassy product, the proteinaceous material has a tendency to discolor or develop a flavor as a result thereof (characteristics which are undesired when a bland, natural-colored, puffed product is sought) and the later produced puffed product has a greater tendency to lose its firmness when it is rehydrated in boiling water. The use of too low a temperature during compaction can prevent one from producing the desired translucent to glassy product or later result in producing a puffed product that is rather tough when rehydrated or has lower water absorption or water retention properties in boiling water.

The application of elevated mechanical pressure to the proteinaceous material tends to encrease the temperature of that material.

When other protein materials are used, it may be necessary to apply external heat to the proteinaceous material so as to subject it to water-boiling temperatures during or in conjunction with the application of elevated pressure for the purpose of forming a plastic mass which is transformed into a translucent to glassy product, and in such instances the application of pressure is conducted in a system (e.g., extruder) that is closed during operation so as to obviate the loss of moisture from the material or system. In order to avoid simultaneously puffing the compacted material (subjected to a water-boiling temperature) when a flowable mass is discharged or ejected from the system into a medium of lower pressure or unconfined zone at atmospheric pressure, it is necessary to cool (e.g., temper) the mass or reduce its temperature to below waterboiling temperatures before the material is discharged or ejected from the system. Such is accomplished by forming the product into an annular shape and cooling both the inside and outside below 212°F to avoid puffing.

The controlled amount or concentration of water present in or with the proteinaceous material which is subjected to elevated pressure and requisite temperature conditions must be sufficient to facilitate converting that material to a plastic state which forms the translucent to glassy product.

The moisture content of the mixture, prior to the elevation of temperature and pressure, should be in the range of from 25 to 40 percent by weight.

When calcium is present with or in the protein material it may be desirable, for some purposes, to use a relatively high level of water (e.g., within the range of about 35 to 40 percent) to increase the water absorption or water retention properties of the puffed product when it is rehydrated in boiling water.

It is essential not to discharge or eject the extrudate under water-boiling conditions or temperature, so that extrusion does not subject the material to simultaneous puffing which normally results from the rapid or sudden release of water vapor from the mass when or as the discharged or ejected extrudate enters a zone of lower pressure. Thus, if such pressures or temperatures are developed prior to the discharge or ejection of the plastic material through the restricted extrusion die, nozzle or orifice which would cause the issuing or issued extrudate to rapidly release water and puff, it is critical to reduce the temperature of the plastic mass so that it is not discharged or ejected under water-boiling or puffing conditions. The pressure differential across the die, nozzle or orifice thus must not cause the extrudate to puff.

Although a variety of injection molding machines, and thermoplastic extrusion and compression molding machines may be used in the forming of the plastic mass, one can advantageously use a heatable extruder having a rotating compression or compaction screw within a closed heatable barrel and temperature controllable, restricted extrusion die, nozzle or orifice at the front end of the barrel such as is described in patent appln. Ser. No. 390,366 heretofore described. The barrel, in conjunction with the compression or compaction screw, creates, during operation, a closed chamber which prevents the release of existing water vapor from the material and system. The rotating screw builds up sufficient pressure to cause the plastic mass to be pushed at the desired temperature and pressure to and through the die. It is critical that the compressed flowable material not be discharged or ejected from the extruder under water-boiling or puffing conditions for the reasons explained above. Therefore, it may be necessary to reduce the temperature of the plastic mass in the extruder by using a cooling or tempering operation or step immediately before discharging or ejecting the extrudate from the extruder. The plastic mass or flowable substance must be extruded or issued in uniform linear flow as an extrudate. The extension, for example, may be air-cooled or may include a jacket through which cooling fluid (e.g., water) may be circulated.

In the event one wished to produce a puffed product having a relatively coarse texture, relatively large cells, and which has more of a tendency to become soft when rehydrated in boiling water, which properties may be acceptable for making snacks, then the translucent to glassy product may be puffed in a separate and distinct operation without first being partly dried.

The grain or cell structure of the textured, puffed food product is related to the puffing conditions used in the moisture content of the translucent to glassy product. Since such textured food products will simulate or be used in or with a wide variety of foods, it is difficult to single out the "best" operating conditions. Generally, it has been found that finer cells result from the puffing operation when the translucent to glassy product to be puffed has a relatively low moisture content. The moisture content of the translucent to glassy product can be reduced to the desired moisture level of from 10 25 25 percent by conventional means (e.g., air drying). One may partly dry the moisture-containing, translucent to glassy material, for example, with air at room temperature or hot circulating air at a temperature within the range of about 120° to 200°F., preferably within the range of about 130° to 150°F. Low heat is preferred, however, to prevent undesirable color and flavor changes.

The translucent to glassy product, regardless of whether or not is has been partly dried, has a continuous structure that resists the rapid or sudden release of moisture therefrom at elevated temperatures but, under water-boiling puffing conditions, allows for the build-up of pressure in the product from moisture which, when rapidly or suddenly released from the product under water-boiling puffing conditions (e.g., at a water-boiling temperature), causes the product to puff or to be texturized.

The puffing step involves subjecting the moisture-containing, translucent to glassy product (regardless of whether or not it has been partly dried) to water-boiling conditions by subjecting it to water-boiling temperature for from 5 to 100 seconds and at a pressure of from 100 to 250 psi and then instantly releasing the pressure to cause puffing. The puffing operation expands the product (e.g., about two to tenfold or more in volume as compared with the volume of the translucent to glassy product as it exists prior to puffing) and produces an expanded, structured, textured, porous product having cells formed by the sudden release of moisture. It is desirable to conduct the puffing step under conditions (e.g., moisture, time and temperature conditions) which obviate the development of undesired taste or flavor or discoloration. Furthermore, the puffing step should be conducted under conditions which cause substantially all of the translucent to glassy product to puff substantially uniformly.

One may, if desired, dry the puffed product to a desired residual moisture content. The puffed product, on contact with boiling water, has good stability, is chewy, resists disintegration, and does not become soft and mushy. In addition, the puffed product can have a high bulk specific volume (e.g., at least about 4cc./gm.). The puffed product, on contact with boiling-water has the texture of natural meat and particularly poultry meat.

DESCRIPTION OF THE PREFERRED EMBODIMENT

The following examples are provided in order to more fully define and explain our invention.

EXAMPLE 1

100 Parts by weight of gelatin is added to 100 parts by weight yellow corn flour and 100 parts by weight water. The final moisture content is about 35 percent by weight. The product is extruded using a laboratory Brabender extruder with a 3 to 1 compaction screw which rotates at 95 rmp. The extruder has a heated barrel temperature of 130°C. The extruder has a die such as is described in U.S. patent application Ser. No. 390,366 attached thereto to cool the product to about 190°F upon ejection from the die. The ejected nonpuffed glassy product is air dried to a moisture content of about 15 percent by weight.

The partly dried glassy extrudate is puffed by placing it in a cereal puffing gun of the type described in U.S. Pat. No. 1,878,782 and ejecting live steam at about 380°F and about 220 psi pressure for about 75 seconds. The puffing gun is suddenly opened to release the pressure and cause the product to puff. The puffed product is rehydrated by placing it in water and is found to closely resemble the texture of natural chicken meat. The texture of this product is found to be superior to that of any simulated meat product before known.

EXAMPLE 2

Example 1 is repeated except the protein material is egg white instead of gelatin. The texture of this product is found to closely resemble meat.

EXAMPLE 3

Example 1 is repeated except the protein material is blood meal instead of gelatin. The texture of this product is found to closely resemble meat.

EXAMPLE 4

Example 1 is repeated except the live steam is injected into the puffing gun at a pressure of about 250 psi for about 25 seconds. Again, the texture of the product was found to be very good.

Examples 1-4 were repeated except the pressure was gradually released over a time period of from 3 to 5 seconds. The resulting product did not resemble meat. This example is not in accordance with the process of this invention.

The above clearly demonstrates that this new and novel invention produces a simulated meat whereas similar prior attempts seriously fail to product such a product.

Having fully described this new and unique invention, we claim:

1. A process for preparing a puffed food product simulating meat comprising:
   A. admixing a proteinaceous mixture of a protein material comprising a member selected from the group consisting of gelatin, microbiological protein, egg white, muscle protein, keratins, lactalbumin, and blood having protein concentrations of at least about 30 percent with water in an amount sufficient to provide a final moisture content of from about 25 percent to about 40 percent by weight;
   B. subjecting the moistened proteinaceous mixture to a pressure above atmospheric pressure and a temperature above 212°F. to convert it into a flowable substance; C. extruding the flowable substance in a uniform linear flow as an extrudate into a medium of lower pressure without puffing the flowable substance, said extruding being accomplished in the form of an annular shape in which both the inside and outside of the annular flowable substance are cooled to a temperature below 212°F. in order to avoid puffing and said extrusion creating a translucent to glassy extrudate;
D. placing the extrudate in a confined space;
E. subjecting the extrudate in the confined space to a water-boiling temperature for a time of from 15 to 75 seconds and a pressure of from 150 to 250 psi; and
F. suddenly releasing the pressure on the extrudate in less than 2 seconds causing the extrudate to puff and resemble simulated meat with said sudden release of pressure removing the translucent to glassy characteristics and creating an exterior skin portion and a fibrous inner portion in the simulated meat.

2. A process as in claim 1 wherein the protein material is gelatin.

3. A process as in claim 1 wherein the protein material is microbiological protein.

4. A process as in claim 1 wherein the protein material is egg white.

5. A process as in claim 1 wherein the protein material is muscle protein.

6. A process as in claim 1 wherein the protein material is a keratin.

7. A process as in claim 1 wherein the protein material is lactalbumin.

8. A process as in claim 1 wherein the protein is blood.

9. A process as in claim 1 wherein the protein is neutralized prior to inclusion in the process.

10. A process as in claim 1 wherein the flowable substance extruded into an issued extrudate state has the moisture thereof partially reduced without puffing prior to placing the extrudate in a confined space.

11. The process of preparing a puffed food product which comprises subjecting moist protein material having a protein concentration of at least about 30 percent comprising a member selected from the group consisting of gelatin, microbiological protein, egg white, muscle protein, keratins, lactalbumin, and blood in the presence of sufficient water to produce a moisture content of from about 25 to about 40 percent by weight and at elevated mechanical pressure above atmospheric pressure, and a temperature above 212°F. to form a moisture-containing, translucent to glassy produce, said forming being accomplished in an annular shape in which both the inside and outside of the annular product are cooled below 212°F. to avoid puffing, partly drying said translucent to glassy product to reduce its moisture content to produce a partly dried product having continuous structure that resists the rapid release of moisture therefrom at elevated temperatures but, under water-boiling puffing conditions, allows for the build-up of pressure in said product from moisture which, when rapidly released from said product under water-boiling puffing conditions, causes said product to puff, and puffing said partly dried product by placing the extrudate in a confined space; subjecting the extrudate in the confined space to a waterboiling temperature for a time of from 15 to 75 seconds and a pressure of from 150 to 250 psi; and suddenly releasing the pressure within 2 seconds on the extrudate thereby causing the extrudate to puff and resembly simulated meat with an exterior skin portion and a fibrous inner portion.

12. A process as in claim 11 wherein the protein material is microbiological protein.

13. A process as in claim 11 wherein the protein material is egg white.

14. A process as in claim 11 wherein the protein material is muscle protein.

15. A process as in claim 11 wherein the protein material is a keratin.

16. A process as in claim 11 wherein the protein material is lactalbumin.

17. A process as in claim 11 wherein the protein is blood.

18. A process as in claim 11 wherein the protein material is neutralized prior to inclusion in the process.

* * * * *

UNITED STATES PATENT OFFICE
CERTIFICATE OF CORRECTION

PATENT NO. : 3,925,565
DATED : December 9, 1975
INVENTOR(S) : Robert R. Reinhart and George M. Smith, Jr.

It is certified that error appears in the above–identified patent and that said Letters Patent are hereby corrected as shown below:

Claim 11, Column 10, Lines 4 and 5, "produce" should read --product--; Claim 11, Column 10, Line 23, "resembly" should read --resemble--.
Column 2, Lines 40 and 41, "features" should read --feathers--.
Column 5, Line 21, "course" should read --coarse--.
Column 8, Line 44, "product" should read --produce--.
Column 2, Line 64, "purr" should read --puff--.
Column 4, Line 27, "5.5 of 8.5" should read --5.5 to 8.5--.
Column 4, Line 41, "of percent of suitable" should read --of a suitable--; Column 4, Line 68, "water it is" should read --water when it is--.
Column 7, Line 14, "10 25 25" should read --10 percent to 25--;
Column 7, Line 23, "is" should read --it--.

Signed and Sealed this sixteenth Day of March 1976

[SEAL]

Attest:

RUTH C. MASON
Attesting Officer

C. MARSHALL DANN
Commissioner of Patents and Trademarks